Feb. 8, 1966 C. E. OLSEN 3,233,391
GAS CLEANING APPARATUS
Filed Dec. 10, 1962

INVENTOR.
CARL E. OLSEN
BY Clyde C. Blinn
ATTORNEY

# United States Patent Office 3,233,391
Patented Feb. 8, 1966

3,233,391
GAS CLEANING APPARATUS
Carl E. Olsen, Wabash, Ind., assignor to Honeywell Inc., a corporation of Delaware
Filed Dec. 10, 1962, Ser. No. 243,269
4 Claims. (Cl. 55—290)

This invention relates to gas cleaning apparatus and more particularly to a novel suction cleaning apparatus for removing collected material from a mechanical gas filter.

Mechanical gas filters currently find application in numerous industrial and commercial installations as well as in residential air treating systems. While these mechanical filters take a great variety of forms, all of them fall within one of two general catagories; disposable or non-disposable. Disposable filters have the advantage that when they have been used in the gas flow system and become dirty and hence ineffective or inefficient, they are merely removed and discarded and replaced by a new filter. While this may be a distinct advantage in certain applications, in other applications it may prove to be extremely costly, particularly if used in an area where there is a high concentration of foreign particles passing through the filter and hence rendering the life of a disposable filter quite short. Also, the systems usually must be shut down while the filter is being replaced.

The non-disposable filter, on the other hnad, has the advantage that when it has become sufficiently dirty to render, it inefficient or ineffective, it may be cleaned and then re-used. There are many types of non-disposable filters, the most common probably being simply a mat or pad-like structure of gas permeable filter material generally enclosed in some type of a frame which may be mounted directly in a gas duct. Another common form of mechanical filter is the endless belt type wherein a belt of filter material is transported by a plurality of rollers and is thereby caused to make one or more passes across the gas flow duct, thereby intersecting the flow of gas passing therethrough.

Various methods have been employed for cleaning non-disposable mechanical filters. These include removal of the filter and merely shaking it to remove the collected materials therefrom, the use of an external vacuum cleaner type device to remove the material therefrom, and, in the case of the endless belt-type filter, sometimes the belt is caused to pass through a cleansing bath of liquid such as oil or other material to remove the materials collected thereon. Obviously, in many applications, it is undesirable to have to shut down the system whenever the mechanical filter needs cleaning. It is even more undesirable to have to remove the filter to clean it. The use of a liquid is often equally undesirable. While the previously mentioned external vacuum cleaning equipment might be utilized while the system is in operation, it has several disadvantages also. The greatest of these is that it requires additional equipment which is not only rather costly but is also cumbersome and may offer a great inconvenience.

In my invention I have provided suction cleaning means for removing the collected materials from a mechanical gas filter which does hot require the use of an external suction or vacuum source for performing this operation. It merely makes use of pressure drops inherent in the gas flow system. The cleaning means is adaptable to either the fixed type mechanical filter or the endless belt type and is used while the system is in operation thus maintaining the filter in a continuously efficient operating condition without requiring shutdown of the system.

While this invention will find application in many systems using a mechanical gas filter, it finds particular advantage in systems where the gas is heavy ladened with foreign material. In such systems the filter might be used alone or it may act as a prefilter for removing the larger foreign material prior to the entry of the gas into a further filter for removing small materials. This subsequent filter might be another mechanical filter but might also be an electronic precipitator. Such a system may also include some temperature conditioning apparatus such as a furnace or air conditioning unit and must include some means such as a blower for moving the gas through the system. By way of example, a typical application of such a system might be in a textile mill wherein a large amount of lint is present in the atmosphere. The mechanical filter would then act as a prefilter for removing the larger lint particles from the air and then, smaller particles would be removed by the electronic precipitator. In such an application, a conventional mechanical filter has been found to be quite unsatisfactory in that the filter becomes clogged with lint particles very rapidly. The systems must then be shut down and the filter cleaned or replaced. However with the system utilizing my invention, it may operate continuously, the prefilter being continuously cleaned while the system is in operation.

In addition to the advantages pointed out above which are provided by the present invention, it should also be noted that the modifications to an existing gas flow system are extremely simple and in many cases the cost thereof may be almost negligible with respect to the entire cost of the system.

It is therefore an object of my invention to provide an improved gas cleaning system.

Another object of my invention is to provide improved means for cleaning a mechanical filter in a gas cleaning system.

A further object of my invention is to provide means for cleaning a mechanical gas filter wherein the filter may be cleaned without removing it from the system and without interrupting operation of the system.

Still a further object of my invention is to provide suction cleaning means for cleaning a mechanical filter mounted in a gas flow system wherein the suction is provided by low pressure areas inherent in the system and thereby without requiring additional suction or vacuum producing equipment.

These and other objects of the invention will become apparent upon reading the following detailed description of the two preferred embodiments of my invention in conjunction with the accompanying drawing wherein.

In the following description of my invention and a system in which it may find application, reference is made to air flow systems and air cleaning apparatus. It is to be understood that the term "air" is being used for convenience only and that the system will be equally applicable to any type of gas.

Figure 1:
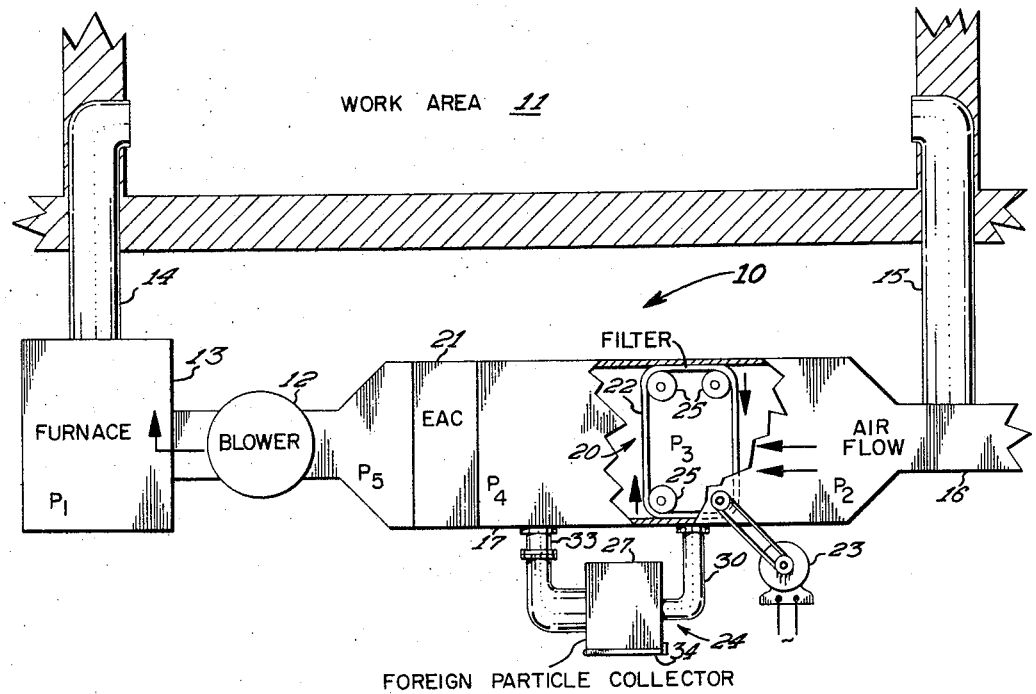
FIGURE 1 is a schematic showing of a conventional gas conditioning system such as that used in many industrial applications, the system utilizing one embodiment of my invention.

FIGURE 1 illustrates a typical system in which my invention will find application. The reference numeral 10 generally designates an air cleaning and conditioning system for supplying conditioned air to a work area 11. This work area may be a portion of any industrial or commercial installation or part of a conventional residence. The cleaning and conditioning system 10 includes a blower 12 for moving air through the system and a temperature conditioning device such as a furnace 13.

It should be noted that while device 13 has been illustrated as a furnace, it might equally as well be an air air conditioning apparatus or a heat pump. Furnace 13 supplies heated air to a warm air supply duct 14 for supplying the work area 11, and a cold air return duct 15 returns the air to a main air duct 16. Duct 16 includes an enlarged portion 17 wherein is mounted a mechanical air filter 20 of the endless belt type which will be described in greater detail with reference to FIGURE 2. A fixed mechanical filter as described hereinafter in connection with FIGURE 3 may be used if desired. Located downstream of filter 20 is an electronic precipitator or electrostatic air cleaner 21 which may be of any conventional design. For example, a precipitator as disclosed in Patent No. 3,028,715 issued to Keith M. Nodolf, April 10, 1962 and assigned to the assignee of the present invention, may be used.

As shown in FIGURE 1, the mechanical filter 20 has an endless belt 22 of filter media which is driven by a conventional electric motor 23. In this case, the belt is driven so that it travels around a substantially rectangular path and travels in a clockwise direction. As air passes through the system, blower 12 establishes a first pressure indicated as P1 at the output thereof. The air returns to main air duct 16 at a somewhat lower pressure indicated as P2 on the upstream side of the mechanical filter 20. Since the filter has some resistance to air flow a pressure drop occurs thereacross and hence a somewhat lower pressure P3 is established between the two sides of the rectangular path followed by the filter. An additional pressure drop occurs across the second layer of the filter 20 and hence a still lower pressure P4 exists downstream of the mechanical filter. An additional pressure drop occurs across the electrostatic precipitator 21 and hence a pressure P5 exists at the inlet to blower 12. Also shown in FIGURE 1 is a suction cleaning means generally indicated at 24 which along with filter 20 will be discussed in greater detail in connection with FIGURE 2.

Figures 2, 3:
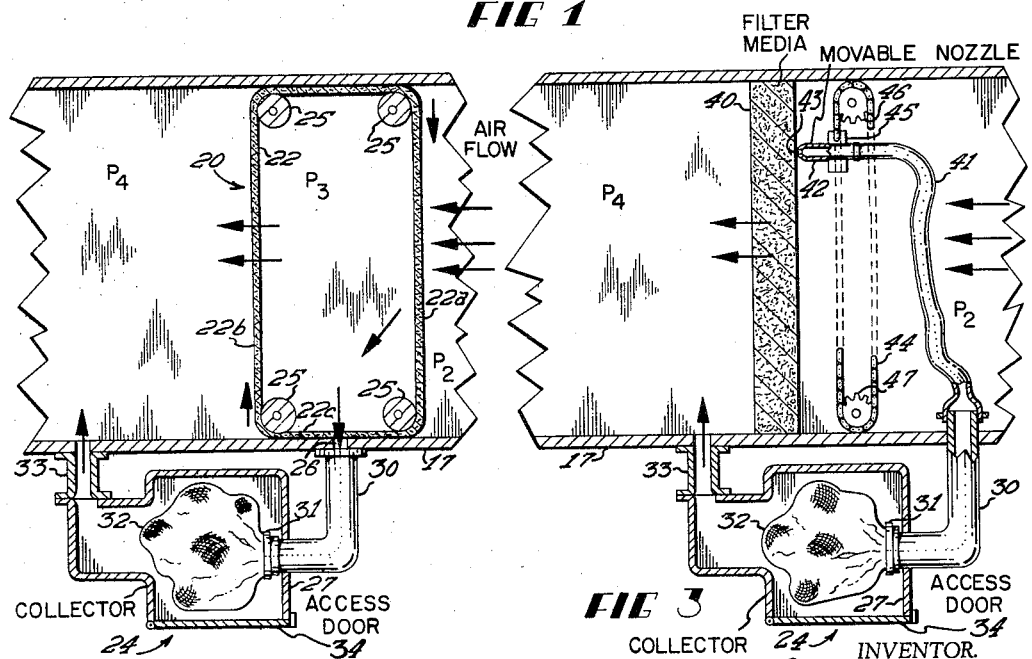
FIGURE 2 is a somewhat schematic, cross-sectional view of one embodiment of my invention.
FIGURE 3 is a somewhat schematic, cross-sectional view of another embodiment of my invention.

Referring now to FIGURE 2, endless belt filter 20 is seen, as described in connection with FIGURE 1, to travel through a generally rectangular path and moves in a clockwise direction. The filter media 22 is carried on four rollers indicated at 25 one of which is driven by the motor 23 which is not shown in FIGURE 2. As the media 22 is moved by rollers 25 one portion 22a is always maintained substantially perpendicular to the direction of air flow at pressure P2. As the air passes through this portion of the filter a pressure drop occurs thus resulting in a pressure P3 on the downstream side thereof. Another portion of the filter 22b passes substantially perpendicular to the direction of air flow on the downstream side of the mechanical filter. A further pressure drop across this portion of the filter results in a pressure P4 on the portion of the filter results in a pressure P4 on the downstream side thereof. At the bottom wall of enlarged portion 17 of duct 16 a further portion 22c of the filter media is in engagement with the wall of the duct. Thus air is prevented from by-passing the filter and also suction cleaning is facilitated as will be further explained hereinafter. A narrow elongated opening 26 in portion 17 of the duct extends across the bottom thereof substantially the full width of the duct. Portion 22c of the filter media is continuously moving across this opening. Opening 26 is connected to a collector box 27 located beneath the duct by a pipe or tube 30. The lower end of pipe 30 extends into one end of collector box 27 and terminates within the box. At the end which is within box 27, pipe 30 has attached thereto, by appropriate means such as a clip ring 31, an air permeable collection bag 32 which substantially fills the collector box 27. An additional pipe 33 connects the other end of box 27 to the downstream side of filter 20 and hence to a pressure P4.

The operation of the apparatus will now be described in connection with FIGURES 1 and 2. As the air passes through work area 11, foreign materials in the air are conducted through return duct 15 to the main air flow duct 16 and are collected on the upstream portion 22a of filter media 22. Due to the differences between pressure P2 and P3 on opposite sides of portion 22a of the filter media, these foreign materials adhere to the filter media and are carried therewith as the filter moves in a clockwise direction. As the filter continues to move, the materials collected at 22a are eventually moved adjacent opening 26. It will be seen that the pressure within collector box 27 is substantially P4 and the pressure within the collector bag 32 will be slightly greater than P4 due to a slight pressure drop through the bag, but will be slightly less than P3 if the material for bag 32 is properly chosen. Thus a pressure drop occurs across the media at 22c tending to remove the collected material from the filter media. This collected material then passes through the pipe 30 and is deposited in the bag 32. Thus the filter 20 is kept clean and operating efficiently at all times. When the bag 32 becomes substantially filled with collected material it is removed by opening an access door 34 on the collector box 27 and by loosening the clip ring 31. The bag may then be emptied or replaced by a new bag. It will be seen that no shutdown of the air cleaning system is required during the changing or emptying of bag 32.

In actual practice this device has been used in connection with air containing large quantities of lint and other foreign material. This material then was collected at the upstream portion 22a of the filter and was found to actually roll off from the filter at the opening 26 and was deposited in the bag 32. Thus the filter media 22 could be used for prolonged periods without replacement or additional cleaning.

FIGURE 3 discloses another embodiment of my invention which utilizes the same principles described in connection with the previous two figures. It is to be understood that the structure shown in FIGURE 3 might be used to replace the structure shown in detail in FIGURE 2 as utilized in the system shown in FIGURE 1. In FIGURE 3 a fixed mechanical filter 40 is shown mounted in the enlarged portion 17 of duct 16. Filter 40 may be a mat or pad of air permeable filter material and may preferably be enclosed in some type of frame (not shown), around its periphery. The upstream side of filter 40 is subjected to air at pressure P2 and due to resistance to air flow of the filter, a pressure drop occurs thereacross. Therefore pressure on the downstream side of the filter 40 is somewhat less and is substantially the same as pressure P4 on the downstream side of the filter 20 illustrated in FIGURE 2.

The collecting box 27 and piping 30 and 33 shown in this embodiment are substantially the same as that shown in FIGURE 2. However in this embodiment the pipe 30 extends into the duct at a position somewhat upstream of filter 40. Attached to pipe 30, inside the duct, is a flexible hose or tube 41 which is connected to a suction nozzle 42 by appropriate means (not shown). Suction nozzle 42 is an elongated device extending substantially the full width of filter 40. Nozzle 42 has an opening 43 at its outermost end which is adapted to engage the filter 40. The nozzle is mounted on an endless chain 44 by a fixture member 45. Endless chain 44 is carried by a pair of sprockets 46 and 47 located adjacent the upper and lower walls of portion 17 of the duct 16, respectively. These sprockets are driven by appropriate means, not shown, such as an electric motor and gear train for slowly moving nozzle 42 along the surface of filter 40.

As described above, nozzle 42 acts upon the upstream side of filter 40 which is subjected to pressure P2. The interior of nozzle 42 is connected to the area within collector bag 32 which, as described in connection with FIGURE 2 will be at a pressure slightly greater than the downstream pressure P4. Thus a suction cleaning effect is obtained and nozzle 42 is effective to remove collected foreign material from the upstream side of filter 40. This material then passes through hose 41 and pipe 30 into the collector bag 32. Again, when the bag 32 is substantially filled with foreign material it may be removed by opening access door 34 and removing the clamping ring 31. Bag 32 may then be replaced by a new bag or may be emptied and reinserted in the cleaner.

From the foregoing, it can be seen that my invention provides a suction cleaning apparatus for use with a mechanical air filter which provides substantial cleaning of the filter without requiring an external source of vacuum or low pressure to obtain the suction effect. The mechanical filter is maintained in a clean and efficient operating condition continuously without requiring periodic shutdown of the filtering system to facilitate cleaning. It will be seen that the structure is particularly applicable for cleaning a mechanical prefilter for use in conjunction with an electrostatic precipitator wherein the prefilter is used to remove the larger foreign material and the electrostatic precipitator to remove the smaller foreign materials. The structure which makes up my invention invention is further seen to be extremely simple and relatively inexpensive and yet highly efficient in operation.

While I have shown certain specific embodiments of my invention, it is to be understood that these are for illustrative purposes only and that, obviously, various modifications thereof will become apparent to those skilled in the art. It is therefore to be understood that the invention is to be limited only by the scope of the appended claims.

I claim as my invention:

1. In a gas flow system: fluid treating means providing a plurality of pressure drops in said system: said fluid treating means including a mechanical filter for removing foreign matter from the gas, said filter having an upstream side and a downstream side; a blower in said system downstream of said mechanical filter for moving gas through the system; suction cleaning means operable upon said filter at an area upstream of said downstream side for removing collected foreign matter from said filter; and means connecting said suction cleaning means to said system between the downstream side of said filter and said blower whereby said blower will provide suction for cleaning said filter without the provision of an external suction means; said connecting means including means for collecting the materials removed from said filter, said collecting means including means defining a collecting area, gas permeable collection media disposed in said collecting area in a position to remove the foreign matter from the gas stream drawn through the connecting means by said blower, and means providing access to said collecting area whereby said collection media may be renewed when full of separated foreign matter.

2. The apparatus described in claim 1 wherein said filter is fixed in the system and said suction cleaning means includes a cleaning nozzle operable upon the upstream side of said filter and wherein there is provided means for moving said cleaning nozzle across said upstream side of said filter.

3. The apparatus described in claim 1 wherein said suction cleaning means includes a fixed portion cooperable with said filter to remove collected material therefrom and wherein said filter is movable past said fixed portion of said suction cleaning means.

4. The apparatus described in claim 3 wherein said filter is of the endless belt type and is mounted in a gas flow duct, wherein there is provided means for transporting said filter and defining an endless path for said filter so that at least two portions thereof are passed transversely to the duct and a third portion between those portions is passed along a wall of the duct and in sliding engagement therewith, and wherein the fixed portion of said suction cleaning means includes a relatively narrow elongated opening extending across the wall of the duct along which the filter is passed, said elongated opening acting as a suction nozzle intermediate the upstream and downstream sides of said filter.

References Cited by the Examiner

UNITED STATES PATENTS

| 996,860 | 7/1911 | Kestner | 55—294 |
| 1,216,677 | 2/1917 | Feilmann et al. | 55—353 |
| 1,814,428 | 7/1931 | Bishop | 55—294 |
| 1,944,268 | 1/1934 | Rathbun | 55—294 |
| 2,372,316 | 3/1945 | Curtis | 55—423 X |
| 2,593,377 | 4/1952 | Wintermute | 55—294 |
| 2,712,858 | 7/1955 | Wintermute | 55—294 |

FOREIGN PATENTS 760,046   10/1956   Great Britain.

ROBERT F. BURNETT, *Primary Examiner.*

HARRY B. THORNTON, *Examiner.*